United States Patent [19]

Choi et al.

[11] Patent Number: 5,327,561
[45] Date of Patent: Jul. 5, 1994

[54] SYSTEM AND METHOD FOR SOLVING MONOTONE INFORMATION PROPAGATION PROBLEMS

[75] Inventors: Jong-Deok Choi, Mount Kisco, N.Y.; Ron K. Cytron, University City, Mo.; Jeanne Ferrante, Briarcliff, N.Y.

[73] Assignee: International Business Machines Corporation, Armonk, N.Y.

[21] Appl. No.: 763,099

[22] Filed: Sep. 20, 1991

[51] Int. Cl.$^5$ .................. G06F 9/45; G06F 9/44; G06F 9/00
[52] U.S. Cl. .................. 395/700; 364/280.4; 364/DIG. 1; 364/973; 364/DIG. 2; 364/232.22
[58] Field of Search .................. 395/650, 700, 800

[56] References Cited

U.S. PATENT DOCUMENTS 4,656,583 4/1987 Auslander et al. .................. 395/700
5,093,916 3/1992 Karp et al. .................. 395/700

OTHER PUBLICATIONS

Cytron et al., *Efficiently Computing Static Single Assignment Form and the Control Dependence Graph*, ACM Tansactions on Programming Languages and Systems, vol. 13, No. 4, pp. 451–490, (1991).
Cytron et al., *An Efficient Method of Computing Static Single Assignment Form*, ACM Transations on Programming Languages and Systems, pp. 25–35, (1989).
Jeanne Ferrante, *The Program Dependence Graph And Its Use In Optimization*, Jun. 1984, 1–33.

Primary Examiner—Kevin A. Kriess
Assistant Examiner—Michael T. Richey
Attorney, Agent, or Firm—Sterne, Kessler, Goldstein & Fox

[57] ABSTRACT

A method and system is provided for constructing sparse evaluation graphs for forward or backward monotone data flow problems. The sparse graph combines information as early as possible, yet directly connects nodes that generate and use information. This allows problems from the large, general class of monotone data flow problems to enjoy the advantages of solutions based on Static Single Assignment (SSA) form.

The present invention includes a compiler configured to transform a source program into optimized executable code. The compiler contains an optimizer which is configured to optimize the source program, in which the source program and optimization program are represented by a data flow framework. The optimizer includes a sparse evaluation graph generator which generates a sparse evaluation graph and an evaluator connected to evaluate the sparse evaluation graph in relation to the data flow framework.

28 Claims, 13 Drawing Sheets

800

1000

1100

1200

SYSTEM AND METHOD FOR SOLVING MONOTONE INFORMATION PROPAGATION PROBLEMS

TECHNICAL FIELD

The present invention relates generally to a method and system of efficiently handling compiler optimization problems, and more particularly to a system and method for constructing a sparse evaluation graph for forward or backward monotone data flow problems.

BACKGROUND ART

Solutions to information problems are needed in most optimizing and parallelizing compilers and software development environments. Compiler optimization problems are typically formulated as data flow frameworks, in which the solution of a given problem at a given program point is related to the solution at other points (Rosen, B. K. *JACM* 26(2):322-344 (April 1979); Tarjan, R. *Journal of the Association for Computing Machinery* 28(3):594-614 (1981)). The quality and speed of evaluating these frameworks are well-understood, and data flow methods are understandably prevalent in most optimizing compilers. Unfortunately, propagation methods commonly used in data flow evaluation are unduly inefficient with respect to time and/or space.

Static Single Assignment (SSA) Form has recently yielded more efficient and powerful solutions for some data flow problems (Cytron et al., *Sixteenth Annual ACM Symposium on Principles of Programming Languages*:25-35 (January 1989) is hereby incorporated by reference herein in its entirety). Characteristic problems solved have been constant propagation (Wegman et al., *Conf. Rec. Twelfth ACM Symposium on Principles of Programming Languages*:291-299 (January 1985)), global value numbering (Bowen et al., *Fifteenth ACM Principles of Programming Languages Symposium*:1-11 San Diego, Calif., (January 1988)), and invariance detection (Cytron et al., *Conf. Rec. of the ACM Symp. on Principles of Compiler Construction* (1986)). Once programs are cast into SSA form, some data flow solutions for these problems have the following advantages: (1) Information is combined as early as possible, (2) information is forwarded directly to where it is needed, (3) useless information is not represented. These advantages follow from the way definitions are connected to uses in a program. The extant SSA-based data flow solutions essentially use SSA form as a sparse evaluation graph that embodies this connection. Unfortunately, SSA form is not sufficiently general to afford an efficient solution for problems not based on this connection, such as Live Variables.

Previous methods for solving data flow problems fall into one of two categories. Traditional bit-vectoring methods propagate the solution at a given node to the control flow graph successors or predecessors of that node (Kildall, G., *Conference Record of First ACM Symposium on Principles of Programming Languages*:194-206 (January 1973)). Compiler writers generally acknowledge that bit-vectors are overly consumptive of space. Moreover, propagation occurs throughout a graph, sometimes in regions that neither affect nor care about the global solution.

The other prevalent solution method uses direct-connections that shorten the propagation distance between nodes that generate and use data flow information. Such solutions are typically based on def-use chains (Aho et al., *Compilers: Principles, Techniques, and Tools* Addison-Wesley (1986)). Def-use chains omit nodes from the flow graph that need not participate in the evaluation. Regularly and unfortunately, direct-connections require combining the same information at each use of a particular variable, rather than just once. In the worst case, a quadratic number of such "meets" can occur where a linear number suffices. Experiments show that such quadratic behavior is noticeable especially for arrays, aliased variables, and variables modified at procedure call sites. Once established, direct connections allow propagation directly from sites that generated information to sites that use information. Although information does not propagate unnecessarily through the graph, the same information could be combined many times whereas earlier combining would be cheaper.

SSA form is a direct connection structure which combines the best of each of the mechanisms. Moreover, its creation does not require the costly traditional methods. However, it can only be used to solve a limited class of data flow problems, such as constant propagation, code motion, and value numbering problems; these problems all require connections from definitions to uses. Def-use propagation based on SSA form (Cytron et al., *Sixteenth Annual ACM Symposium on Principles of Programming Languages*:25-35 (January 1989)) or its precursors (Reif et al., *Conf. Rec. Fourth ACM Symposium on Principles of Programming Languages* (1977); Reif et al., *SIAM Journal of Computing* 11(1):81-93 (February 1982)) can usually avoid this expense by combining information as early as possible. However, if def-use chains are explicitly computed by solving Reaching Definitions and Live Variables, then bit vectors would still be required.

DISCLOSURE OF INVENTION

The present invention provides a method and system for constructing sparse evaluation graphs for solving forward and backward monotone data flow problems. The present invention includes a compiler configured to transform a source program into optimized executable code and an optimizer contained within the compiler. The optimizer of the present invention is configured to optimize the source program, in which the source program and optimization problem are represented by a data flow framework. The optimizer includes a sparse evaluation graph generator which generates a sparse evaluation graph and an evaluator connected to evaluate the sparse evaluation graph in relation to the data flow framework.

The sparse evaluation graph combines information as early as possible, yet directly connects nodes that generate and use information. This allows problems from the large, general class of monotone data flow problems to enjoy the advantages of solutions based on Static Single Assignment (SSA) form.

Like traditional methods, the sparse evaluation graph combines information in "meets" as early as possible. Like direct connection methods, the sparse graph directly connects nodes that generate and use information, omitting many nodes in the flow graph which simply pass information through without affecting the solution. The present invention combines these two advantages to give time and space efficiency when using the sparse evaluation graph in information propagation.

The optimization of the present invention yields many fewer edges for problems normally solved by bit-vectoring methods, since in general there are many nodes that transfer "constant" information. At the input to such a node in the sparse evaluation graph, using the present invention, no edge is inserted nor does a "meet" of information take place. At the nodes output, the constant information is directly propagated, again without insertion of an edge. The sparse graph also accommodates demand-driven situations in which a data flow solution is sought for a subset of flow graph edges.

In addition, the present invention is applicable to all monotone data flow problems, and not just those based on def-use chains.

BRIEF DESCRIPTION OF DRAWINGS

The foregoing and other objects, features and advantages of the invention will be apparent from the following more particular description of preferred embodiments of the invention, as illustrated in the accompanying drawings in which.

BEST MODE FOR CARRYING OUT THE INVENTION

I. Environment of the Present Invention

A more detailed description of some of the basic concepts discussed in this section is found in a number of references, including Aho et al., *Compilers: Principles, Techniques, and Tools* Addison-Wesley (1986) which is hereby incorporated by reference herein in its entirety.

Figure 1:
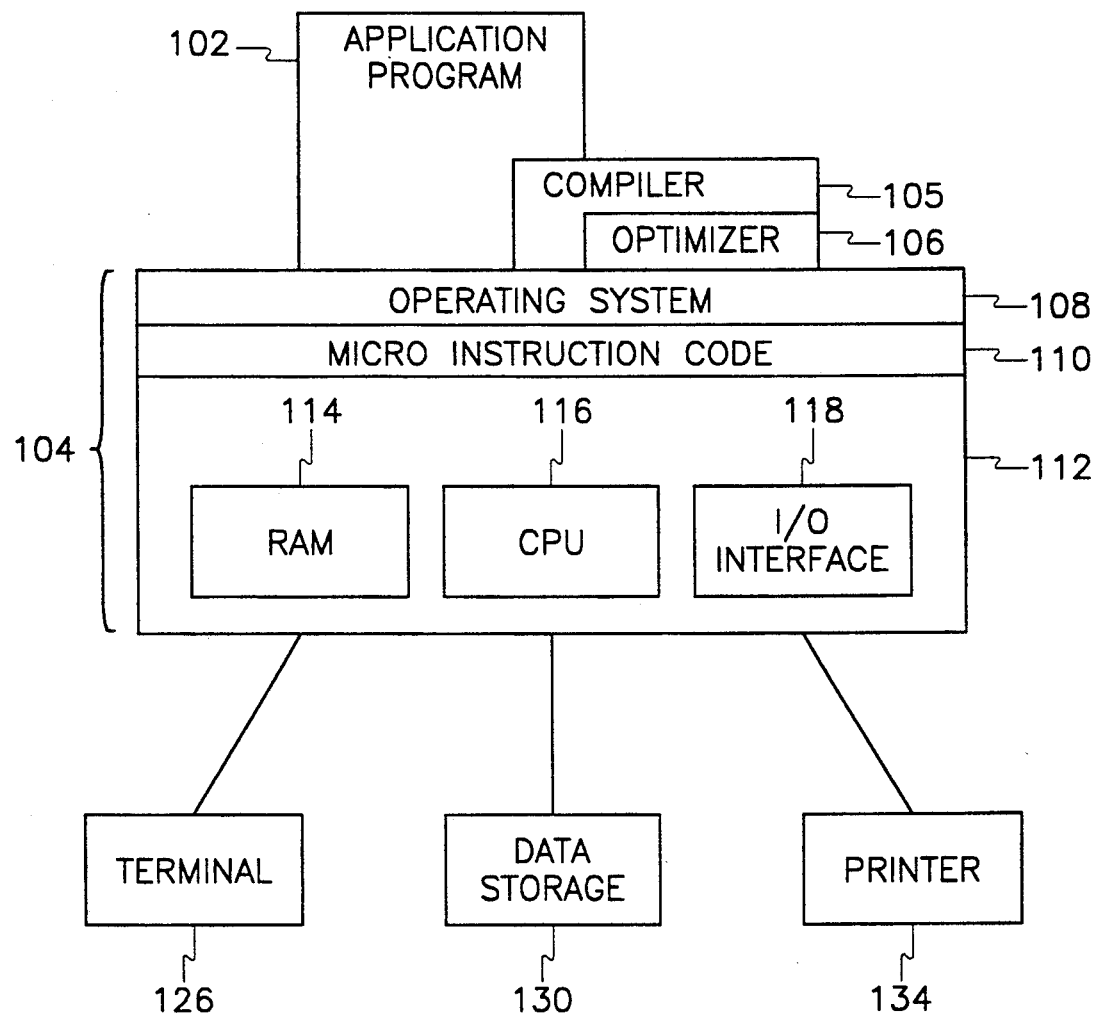
FIG. 1 illustrates an environment in which the preferred embodiment of the present invention operates.

FIG. 1 illustrates an environment in which a preferred embodiment of the present invention operates. The preferred embodiment of the present invention includes application programs 102. One type of application program is a compiler 105. The compiler 105 is configured to transform a source program into optimized executable code or more generally from a source program to an optimized form. The compiler operates on a computer platform 104. Optimizer 106 makes up a portion of the compiler 105. The preferred emobodiment of the present invention operates within the optimizer 106.

The computer platform 104 includes a hardware unit 112 which includes multiple central processing units (CPU) 116, a random access memory (RAM) 114, and an input/output interface 118. The computer platform 104 includes an operating system 108, and may include micro-instruction code 110 (or a reduced instruction set, for instance). Various peripheral components may be connected to the computer platform 104, such as a terminal 126, a data storage device 130, and a printing device 134.

In a preferred embodiment of the present invention, the computer 104 is any personal or mainframe computer. The operating system 108 may be any operating sytem compatible with the computer 104 being utilized.

Those skilled in the art will readily understand the equivalents to the above structure.

II. Background

Statements of a program are organized into (not necessarily maximal) basic blocks, where program flow enters a basic block at its first statement and leaves the basic block at its last statement. A control flow graph (CFG) is a directed graph defined as: $CFG = <N_{CFG}, E_{CFG}, Entry>$. The nodes $N_{CFG}$ are the basic blocks of a program and two additional nodes, Entry and Exit. The edges $E_{CFG}$ represent transfers of control or jumps between the basic blocks. In addition, there is an edge from Entry to any basic block at which the program can be entered, and there is an edge to Exit from any basic block that can exit the program. There is also an edge from Entry to Exit; the above is further described in Cytron et al., *Sixteenth Annual ACM Symposium on Principles of Programming Languages*:25–35 (January 1989)). We assume that each node is on a path from Entry and on a path to Exit.

If (Y,Z) is an edge of CFG, then we write $Y \rightarrow Z$. Because we are concerned with backward as well as forward data flow problems, we write $Z \leftarrow Y$ to indicate that information flows from Z to Y even through the CFG edge is oriented from Y to Z.

The input to the present invention is a data flow framework as described in Marlowe, T. J., *Data Flow Analysis and Incremental Iteration*, Rutgers University (October 1989). The data flow framework includes a Flow Graph and a formal basis for describing the behavior and interaction of flow graph nodes. The behavior of each node is formalized by its transfer function, which describes how a node affects the solution as a function of the behavior of other nodes. When considered as a whole, the nodes' transfer functions present a system of simultaneous equations, whose maximum fixed point (MFP) global evaluation provides the best computable solution at all edges or nodes of the flow graph. In other words, all other correct solutions are either uncomputable or not as precise.

The data flow framework is defined as: $D = <FG, L, F>$. Flow Graph $FG = <N_{CFG}, E_{FG}, root>$ has the same nodes as CFG but its edges are oriented in the direction of the data flow problem. For forward flow problems, FG=CFG and root=Entry, but for backward flow problems $$E_{FG} = \{(Z,Y) | (Y,Z) \epsilon E_{CFG}\}$$

and root=Exit. Successors and predecessors are defined with respect to the direction of flow:

$$Succ(Y) = \{Z | (Y,Z) \epsilon E_{FG}\}$$

$$Preds(Y) = \{X | (X,Y) \epsilon E_{FG}\}$$

Meet Semilattice L= $<A, T, \bot, \leq, \Lambda>$, where A is a set whose elements form the domain of the data flow problem, T and $\bot$ are distinguished elements of A, usually called "top" and "bottom" (symbolizing the best and the worst possible solution to the optimization problem, respectively), $\leq$ is a reflexive partial order, and $\Lambda$ is the associative and commutative meet operator, such that for any a,b $\epsilon$A, $$a \leq b \Leftrightarrow a \Lambda b = a$$
$$a \Lambda a = a$$
$$a \Lambda b \leq a$$
$$a \Lambda T = a$$
$$a \Lambda \bot = \bot$$

Transfer Functions F is a set of functions $$F \{f:L \rightarrow L\}$$

containing the identity function $\iota$ and closed under composition and pointwise meet. The data flow effect of node Y is described by its transfer function $f_y \epsilon F$. Because the CFG is augmented with Entry and Exit, we can assume $$f_{root} = T$$

The local properties of node Y are captured by its transfer function:

$$OUT_Y = f_Y(IN_Y), \text{ where } IN_Y, OUT_Y \epsilon L$$

After a framework has been globally evaluated, each node Y has a solution $OUT_Y$ that is consistent with transfer functions at every node. In general, the best computable solution for a data flow framework is the maximum fixed point convergence of the equations:

$$OUT_{root} = T$$

$$IN_Y = \underset{X \epsilon Preds(Y)}{\Lambda} OUT_X$$

$$OUT_Y = f_Y(IN_Y)$$

which is called the Maximum Fixed Point (MFP) solution (Hecht, Matthew S., *Flow Analysis of Computer Programs* Elsevier North-Holland, Inc. (1977); Kennedy, Ken *Program Flow Analysis: Theory and Applications* (1981); Rosen, B. K. *Program Flow Analysis: Theory and Applications* (1981)). During such evaluation, $IN_Y$ travels down the lattice from T to the element that represents the best computable solution prior to Y, regardless of flow path taken.

In traditional (bit-vectoring) graphs, edges of the flow graph retain the best available solution. Thus, the representative lattice element for $IN_Y$ is $$IN_Y = \underset{x \epsilon Preds(Y)}{\Lambda} OUT_X$$

and the number of lattice elements combined by the meet at node Y is limited to the in-degree of Y in FG. Direct-connection methods compute $IN_Y$ by identifying nodes that affect the solution prior to Y:

$$IN_Y = \underset{x \epsilon Affects(Y)}{\Lambda} OUT_X$$

The expense of this meet could be proportional to the number of nodes in CFG.

The present invention is concerned with identity transference and constant transference. If the transfer function at node Y satisfies $$\nabla l \epsilon L, f_Y(l) = l$$

then node Y has identity transference; this is expressed as:

$$f_Y = \iota$$

where $\iota$ is the identity function. Transfer functions at such nodes cannot affect data flow information. If the transfer function at node Y satisfies $$k \epsilon L \text{ such that } \nabla l \epsilon L, f_Y(l) = k$$

then node Y has constant transference; this is expressed as:

$$f_Y = K_Y$$

The transfer function is single-valued and therefore independent of any other node's solution. An example of a constant transfer function that occurs in all frameworks is $$f_{root} = K_{root} = T$$

III. Construction of the Sparse Evaluation Graph

Given a monotone data flow framework as described above, the sparse evaluation graph can be constructed. The nodes of the sparse evaluation graph are flow graph nodes that generate information for the data flow problem, or represent the earliest node where new information must be combined. The edges of the sparse evaluation graph directly propagate information to nodes that use or combine the information. If a node transfers "constant" information, then no information is combined at its input and its output is directly propagated.

The present invention requires prior computation of the following structures which may be computed using any well-known technique: a Dominator Tree and a Dominance Frontier. A Dominator Tree (DT) of FG is computed in $O(E\alpha(E))$ time (Lengauer et al., *TOPLAS* (July 1979)). Node X dominates node Y if every path from the initial node (e.g., entry) of the flow graph to Y goes through X. Under this definition every node dominates itself. In addition, node X dominates node Y if X is an ancestor of Y in the dominator tree; X strictly dominates Y (is not allowed to dominate itself) if X is a proper ancestor of Y.

The Dominance Frontier (DF) of FG is computed in time $O(E+N^2)$ for arbitrary FG, but only linear time is required for programs restricted to do-while and if-then-else branching. The set of nodes in the dominance frontier of X is $DF(X) = \{Z \mid X$ dominates some $Y \epsilon Preds(Z)$ but X does not strictly dominate $Z\}$.

$DF^+(X)$ is the iterated dominance frontier of X, which is the limit of the sequence:

$$DF_1 = DF(X)$$

$$DF_{i+1} = DF_i \cup \bigcup_{Z \epsilon DF_i} DF(Z)$$

For a more detailed description of the Dominance Frontier see Cytron et al., *Sixteenth Annual ACMS Symposium on Principles of Programming Languages:* 25-35 (January 1989).

These structures depend only on FG and not on any other aspect of the data flow framework. Once DT and DF have been computed for CFG to solve a particular forward or backward data flow problem, subsequent data flow problems do not require their recomputation.

The procedure for constructing the sparse evaluation graph uses in the worst case time and space $O(M+D)$, where M is the number of Meet Nodes and D is the size of all dominance frontier sets. Since for many problems, M is small, and D is expected to be linear on real programs, the computation of the sparse evaluation graph is linear in many cases.

Moreover, the present invention applies equally well to irreducible programs. Inputs to the procedure of the present invention include the Data flow framework (D), the dominator tree (DT), and the dominance frontier (DF). The output from the procedure of the present invention is a sparse graph $SG = <N_{SG}, E_{SG}>$ and a mapping function $M:E_{FG} \rightarrow N_{SG}$.

The pseudo code for Constructing the sparse graph is shown below.
SparseGraph (D, DT, DF)
1. $N_{SG} = \{root\} \cup \{Y \mid f_Y \neq \iota\}$ 2. $\text{MeetNodes} = \bigcup_{X \epsilon N_{sg}} DF^+(X)$ 3. $N_{SG} = N_{SG} \cup \text{MeetNodes}$
4. $\nabla Y \epsilon N_{SG}, IN_Y = T$
5. Stack = empty, with operators push and pop, and top of stack pointer TOS.
6. Search(root)
   Procedure Search (Y)
   1. if $Y \epsilon \text{MeetNodes}$ then Link(Y)
   2. if $Y \epsilon N_{SG}$ then push(Y)
   3. for each $Z \epsilon Succ (Y)$
      (a) $M((Y,Z)) = TOS$
      (b) if $Z \epsilon \text{MeetNodes}$ then Link(Z)
   4. for each child C of Y in DT do Search(C)
   5. if $Y \epsilon N_{SG}$ then pop(Y)
   Procedure Link (Z)
   if $Z \epsilon N_{SG} - \{root\}$ then
   1. if $f_Z = K_Z$ then /* No Edge Added */
   2. else (a) if $f_{TOS} = K_{TOS}$ then $IN_Z = IN_Z \wedge K_{TOS}$ (b) else $E_{SG} = E_{SG} \cup (TOS, Z)$ In the preferred embodiment of the present invention the computer code used to implement the above procedure is PL/1. Any known or future developed computer code could be used to implement the present invention.

Figure 5:
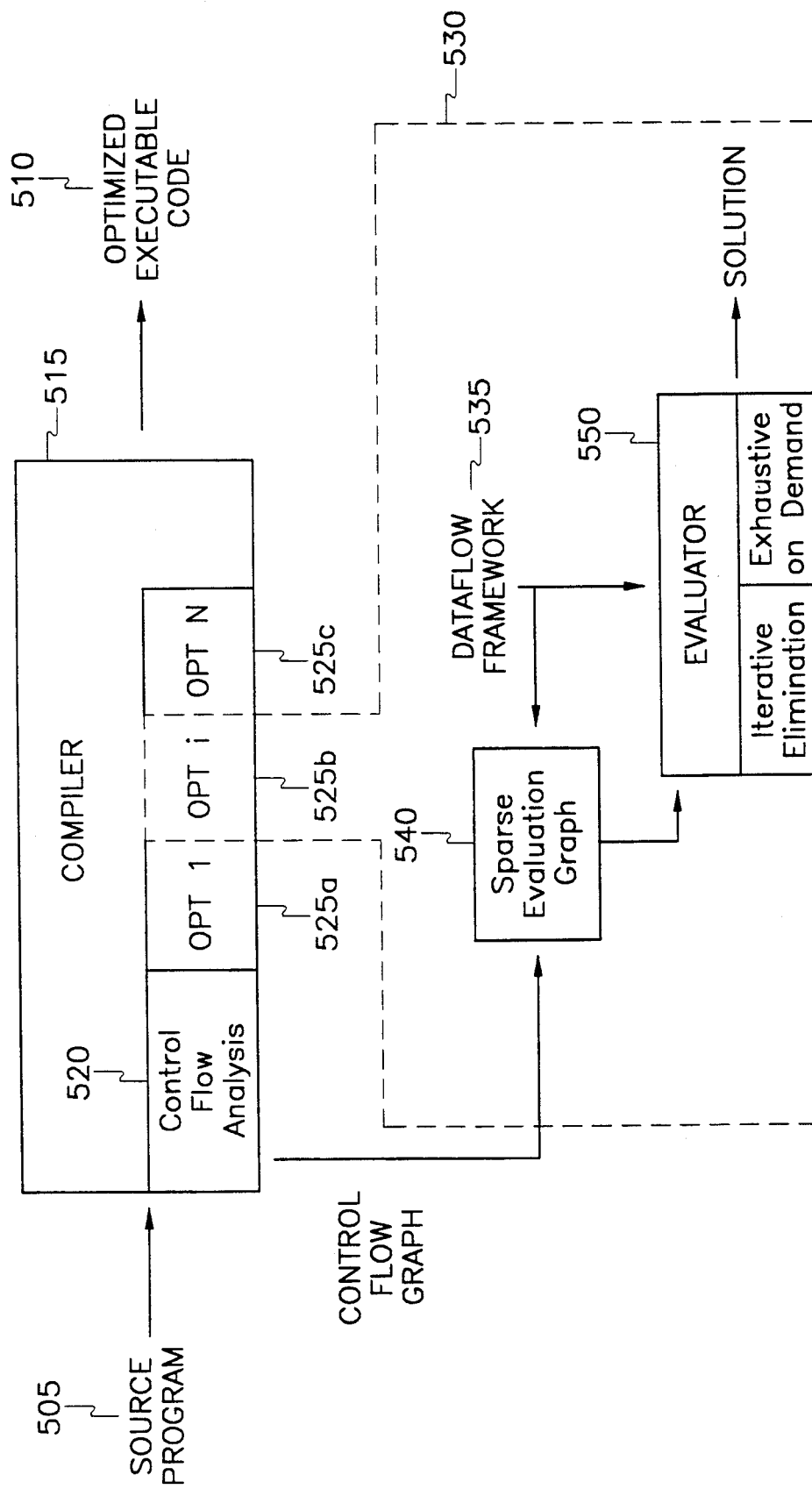
FIG. 5 shows a block diagram of a system configuration for the present invention.

FIG. 5 illustrates a high level block diagram of the preferred embodiment of the present invention. The present invention is part of a compiler 515 as described above. A source program 505 enters the compiler 515. The present invention 530 includes a sparse evaluation graph generator 540 and an evaluator 550. The data flow framework 535, described above, serves as an input to both the generator 540 and the evaluator 550. The compiler 515, through a series of steps, converts the source program 505 into optimized executable code 510. The compiler 515 divides the source program into a plurality of optimization sections 525a, 525b, and 525c. The present invention 530 operates on one optimization section 525 at a time.

Figure 2:
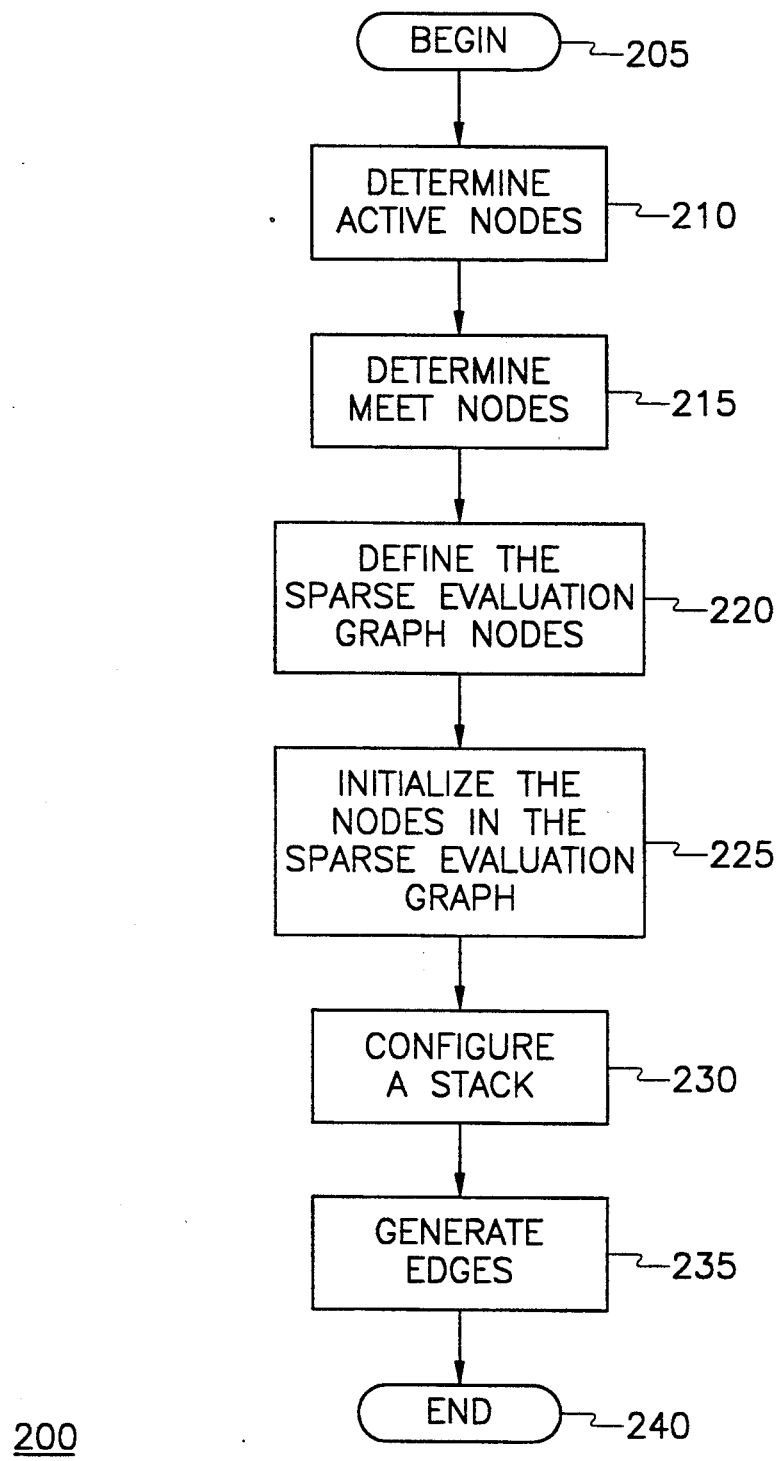
FIG. 2 shows a flow chart for generating the sparse evaluation graph of the present invention.
Figure 3:
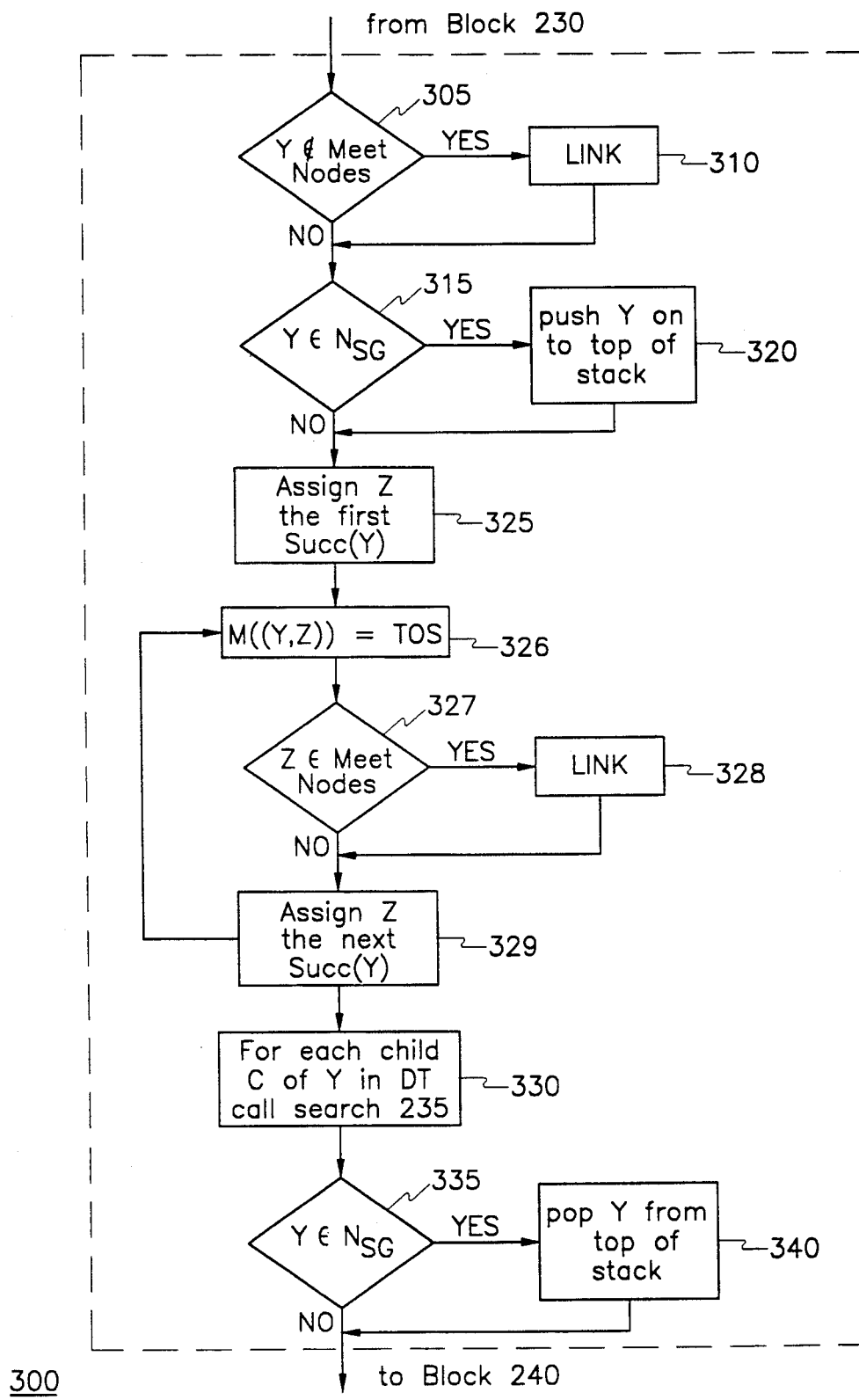
FIG. 3 shows a flow chart for determining which edges should be added to the sparse evaluation graph.
Figure 4:
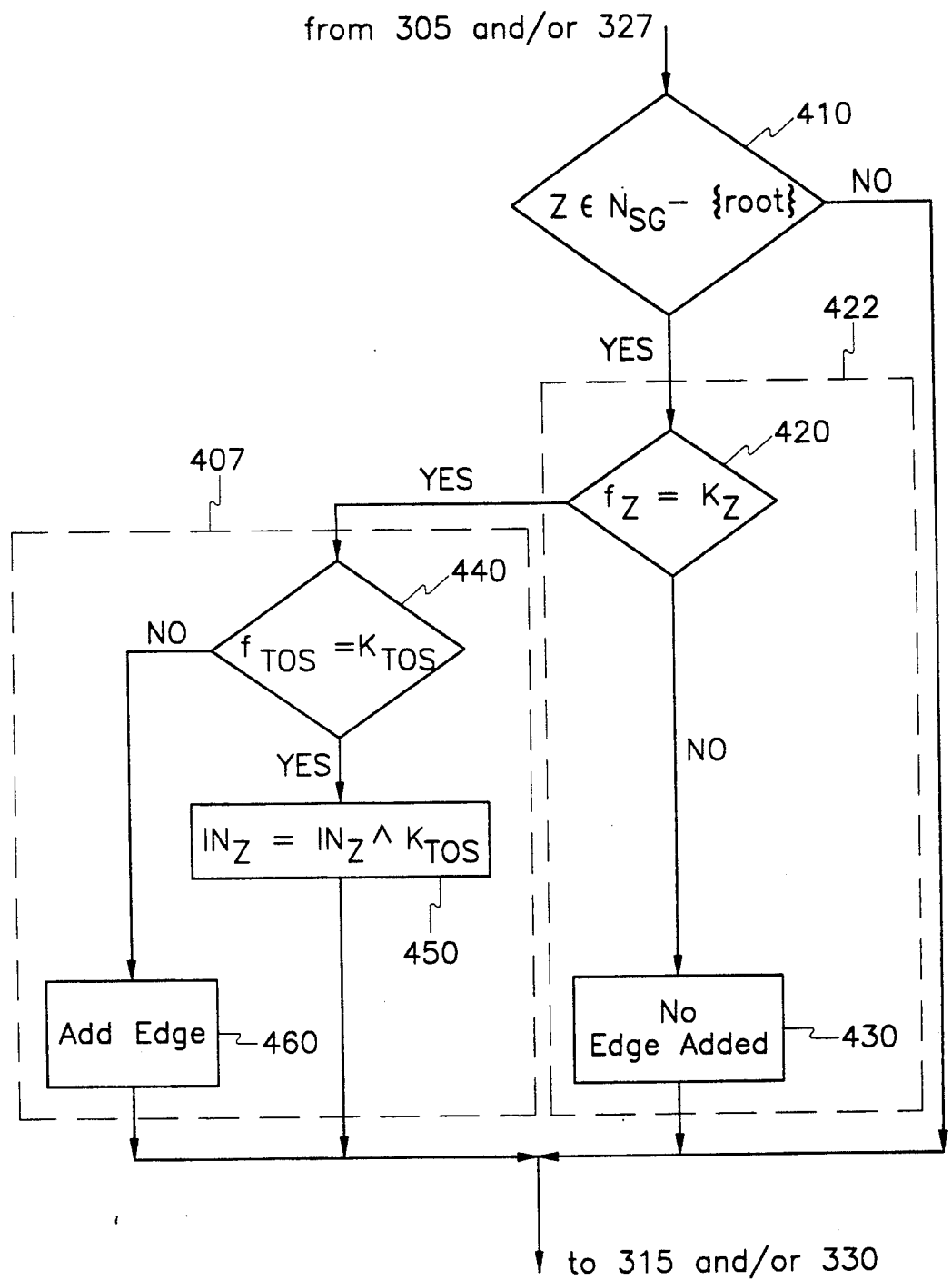
FIG. 4 shows a flow chart of the procedure for adding an edge into the sparse evaluation graph.
Figure 6:
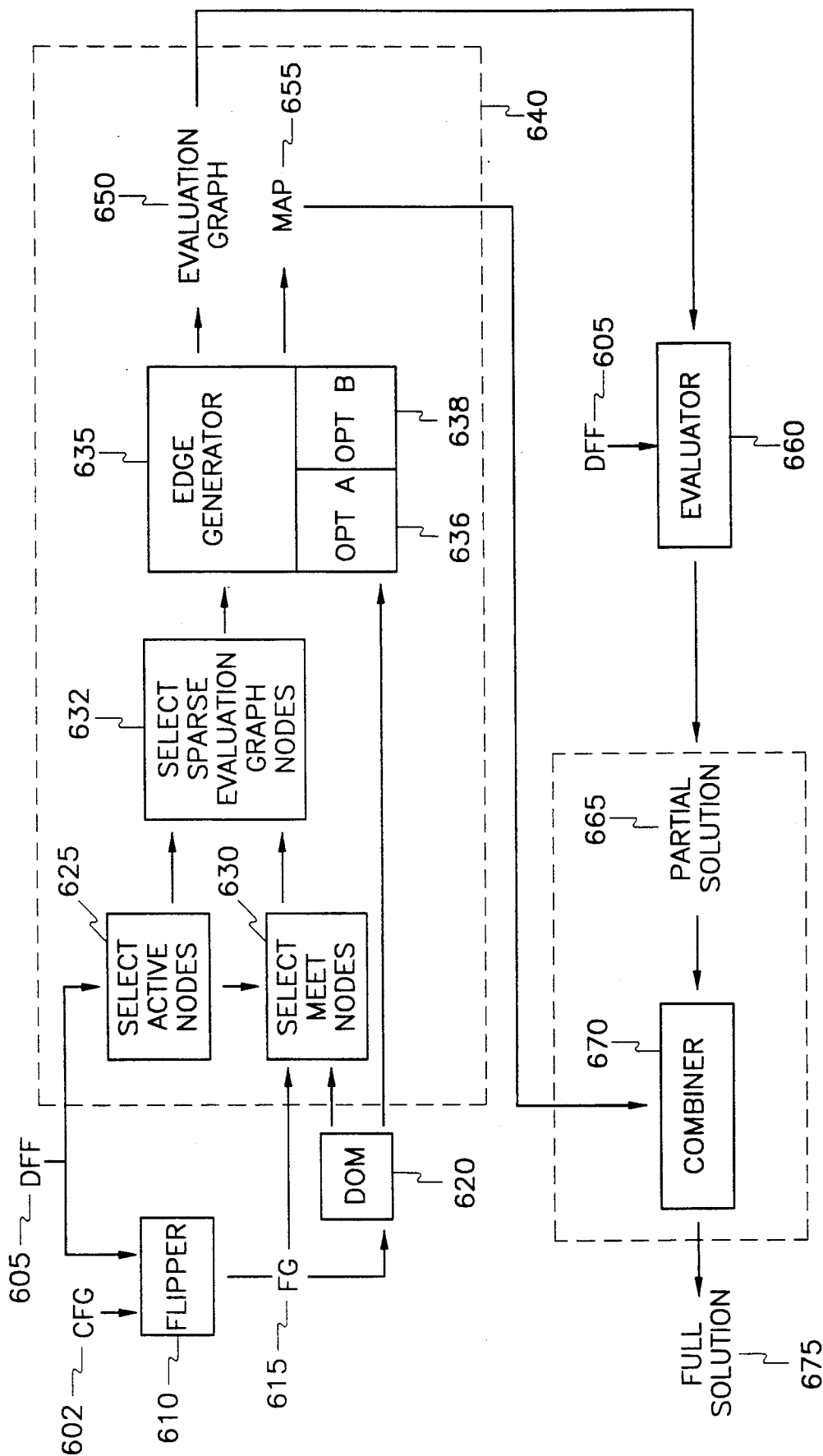
FIG. 6 shows a block diagram of the procedure for constructing a sparse evaluation graph.

FIGS. 2, 3, and 4 are flow charts constructed from the psuedo code shown above. FIG. 6 is a more detailed block diagram of block 530 of FIG. 5, and a high level representation of FIGS. 2, 3, and 4. The procedure of constructing a sparse evaluation graph is described with reference to FIGS. 2, 3, 4, and 6 concurrently.

The procedure 200 begins when the compiler sends a message to the optimizer to begin 205. As indicated in FIG. 6, the data flow framework 605 and control flow graph 602 are input into the system. Flipper 610 is configured to reverse the control flow graph 602 when the data flow problem currently being handled is a backward problem. DOM 620 is configured to determine the dominator tree and the dominance frontier. Both the outputs from the Flipper 610 and DOM 620 are connected to the inputs of sparse evaluation graph generator 640.

The procedure 200 proceeds to block 210 (also represented by block 625) where the nodes of the sparse graph are initially defined as the combination of the root node and every other node that does not have an identity transfer function. The nodes defined by block 210 are called the active nodes of the CFG. Nodes with identity transference are not included in the sparse graph by block 210. However, some of the nodes that do have an identity transference may be included in the sparse graph by block 215, described below, because information must be combined at such nodes.

The procedure 200 then proceeds to block 215 (also represented by block 630), in which the Meet Nodes are determined. Meet Nodes are defined as nodes where information comes together. The Meet Nodes are determined by considering all X in the sparse graph defined in block 210. Thus, block 215 takes the iterated Dominance Frontier of each node defined to be in the sparse graph in block 210.

Block 220 (also represented by block 632) re-defines or selects the sparse evaluation graph nodes to include the nodes defined to be in the sparse graph in Block 210 (i.e., the active nodes) and the Meet Nodes defined in Block 215.

The procedure 200 next proceeds to block 225. The sparse evaluation graph construction procedure 200 of the present invention is concerned with forward propagating information into the input of the nodes. Block 225 initializes each node input in the defined sparse graph to be the best possible solution.

Block 230 configures a stack to be used by block 235. The stack is initially empty and the configuration includes stack operations push and pop. In addition, the procedure defines a pointer that points to the top of the stack (TOS).

The edge generator 635 produces the edges for the sparse evaluation graph 650, as well as a mapping 655 from the edges of the original flow graph 602 to the nodes in the sparse evaluation graph 650. This mapping 655 yields the final data flow solution, described in detail below, over all edges in the flow graph 615. The edge generator 635 is represented by block 235 in FIG. 2.

FIG. 3 is a detailed flowchart representing the Search procedure of block 235 of FIG. 2. The search procedure 300 is a recursive procedure which looks at the information that was given (i.e., which node the procedure is currently visiting) and performs the search procedure 300 for every child of that node in the Dominator Tree. The present invention uses a pre-order and post-order traversal of the dominator tree such that each node is visited twice. Pre-order refers to having the procedure perform a given function for the node currently being visited before visiting the node's children, and post-order refers to the situation when the procedure visits the nodes' children before performing the given function.

As indicated above in the psuedo code of the present invention, the first node visited by the search procedure 300 is root. Thus, if the data flow problem is a forward problem (e.g. reaching definitions) then root would be equal to Entry. However, if the data flow problem is a backward problem (e.g. live variables) then root would equal Exit.

Block 305 determines whether the node being visited is a meet node. If the node being visited is not a meet node then procedure 300 proceeds to block 310. Thus, if node Y requires input, a propagating edge is added by calling the Link procedure 310.

FIG. 4 is a detailed flowchart representing the Link procedure of block 310 in FIG. 3. The Link procedure 400 is called by the search procedure 300 when an edge might be required to be placed in the sparse graph. Any node that is not in the sparse graph is automatically excluded during the Link procedure 400 by block 410. The nodes are visited in the order determined by the dominator tree, and it is this order that makes the present invention optimize so quickly.

The Link procedure 400 tries two different optimizations (blocks 422 and 407) related to constant transference to eliminate edges from the sparse graph. Every edge in the graph has two ends, namely a source and a target. The optimization performed in block 420 is valid for any evaluation of the sparse graph, while the optimization at block 440 is valid only for the prevalent maximum fixed point evaluation.

The first optimization 420 is concerned with eliminating edges from the graph, where the target of such an edge is unconcerned about its input. Specifically, block 420 tests to see if the node in procedure 400 is currently trying to put an edge into, namely Z, has a constant transfer function. If the node does have a constant transfer function then the procedure 400 does not put an edge into the node. Otherwise, the second optimization 407 asks whether the source of the potential edge has a constant transfer function, and if so, instead of placing the edge into the sparse evaluation graph, block 450 propagates the information directly into the target of the edge (i.e., the IN value of node Z).

If those two optimization fail then Block 460 operates and it puts an edge into the sparse evaluation graph. Whenever procedure 400 puts an edge into the sparse evaluation graph at node Z, it always adds an edge to the node Z from the top of the stack. OPT A 636 and OPT B 638 are the representations of the two optimizations inside the LINK procedure 400 described above.

Blocks 320 and 340 are concerned with the stack. The only nodes pushed onto the stack are nodes that are in the sparse graph. The procedure 300 is basically a traversal of the dominator tree and whenever the procedure hits a node in the tree that is in the sparse evaluation graph, that node is pushed onto the stack.

Blocks 325, 326, 327, 328, and 329 perform the mapping function of the sparse graph generator. The present invention maps the edges of the original flow graph to nodes in the sparse evaluation graph. The mapping function is performed for every successor node Z of the node Y currently being visited. Block 325 assigns the first successor of node Y to Z. Block 326 maps the successor node Z with the node currently on the top of the stack, which as described above, is always a node in the sparse evaluation graph. Finally, if the successor node Z is a meet node, then the procedure 300 proceeds to block 328. Block 328 performs the Link procedure 400 described above. However, this time the procedure 400 is concerned with putting a meet edge into the sparse evaluation graph. Once the procedure 300 returns from the LINK procedure 400, block 329 assigns Z another successor of Y and the process starting in block 326 is repeated. This continues until all successors of Y have been considered.

Procedure 300 proceeds to Block 335. If the node currently being visited is a node in the sparse graph, then it has to be removed from the stack. Block 340 represents this operation.

As shown in FIG. 6, the input to the evaluator 660 is the sparse graph 650 and the data flow framework 605. Consequently, the evaluator 660 only gives a solution for the nodes in the sparse graph 650 (i.e., a partial solution 665 for the data flow problem). The combiner 670 takes the partial solution 665 and the map 655 that is generated by the edge generator 635 and combines the two to give a complete solution 675 for all edges in the CFG. Occasionally, a complete solution is not always needed. There are numerous stages between the partial solution and the complete solution that might be useful. Thus, the combiner 670 can also be configured to extend the partial solution to any desired degree depending on the specific application interested in solving the data flow problem.

IV. Examples of Using the Sparse Evaluation Graph to Solve a Typical Data Flow Problem The procedure of the present invention can be used to solve a variety of backward and forward data flow problems, including Live Variables, Reaching Definitions, and Reaching Uses. An example of all three of these data flow problems is presented and solved below.

1. Live Variables

The present invention can accommodate the Live Variables problem which is not readily solvable using SSA form. A variable v is live on CFG edge X→Y if there exist a node Z that uses v, a (possibly empty) path in CFG→Z and no nodes on the path Y→Z that kill v (the live variable problem is discussed in Aho et al., *Compilers: Principles, Techniques, and Tools* Addison-Wesley (1986)).

Figure 7:
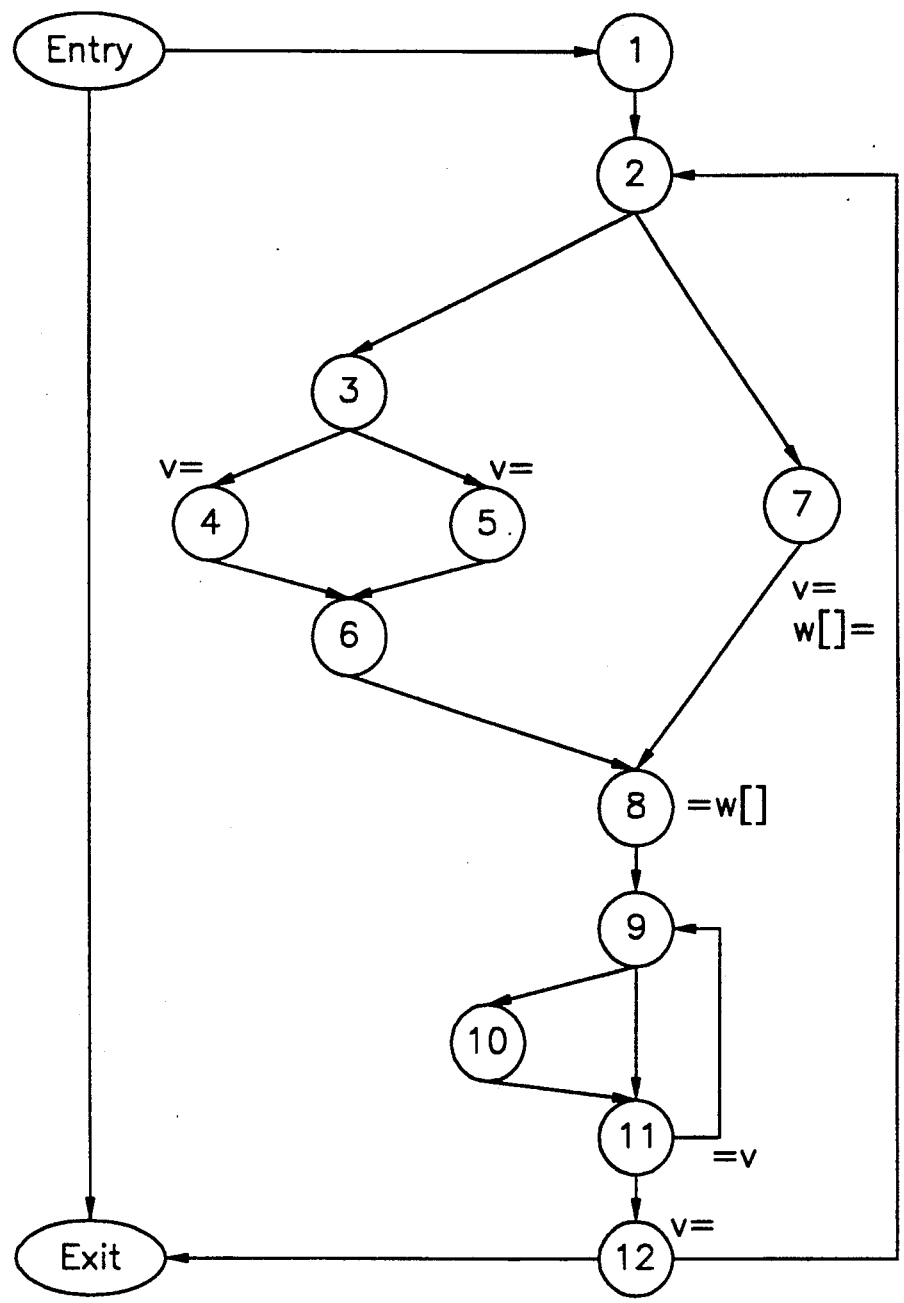
FIG. 7 shows an example of a control flow graph.

This problem is a well-known backward data flow problem, whose solution is not simplified for programs in SSA form. Programs in SSA form could be analyzed for liveness using traditional methods. However, $\phi$-functions that are associated with the SSA form can actually hinder such analysis. In FIG. 7, $\phi$-function assignments would be placed at node 6, 8, and 2 due to the definitions of v. If treated as ordinary assignments, each $\phi$-function assignment is a kill and a use of v, thereby obscuring the liveness properties of the original assignments.

Figure 8:
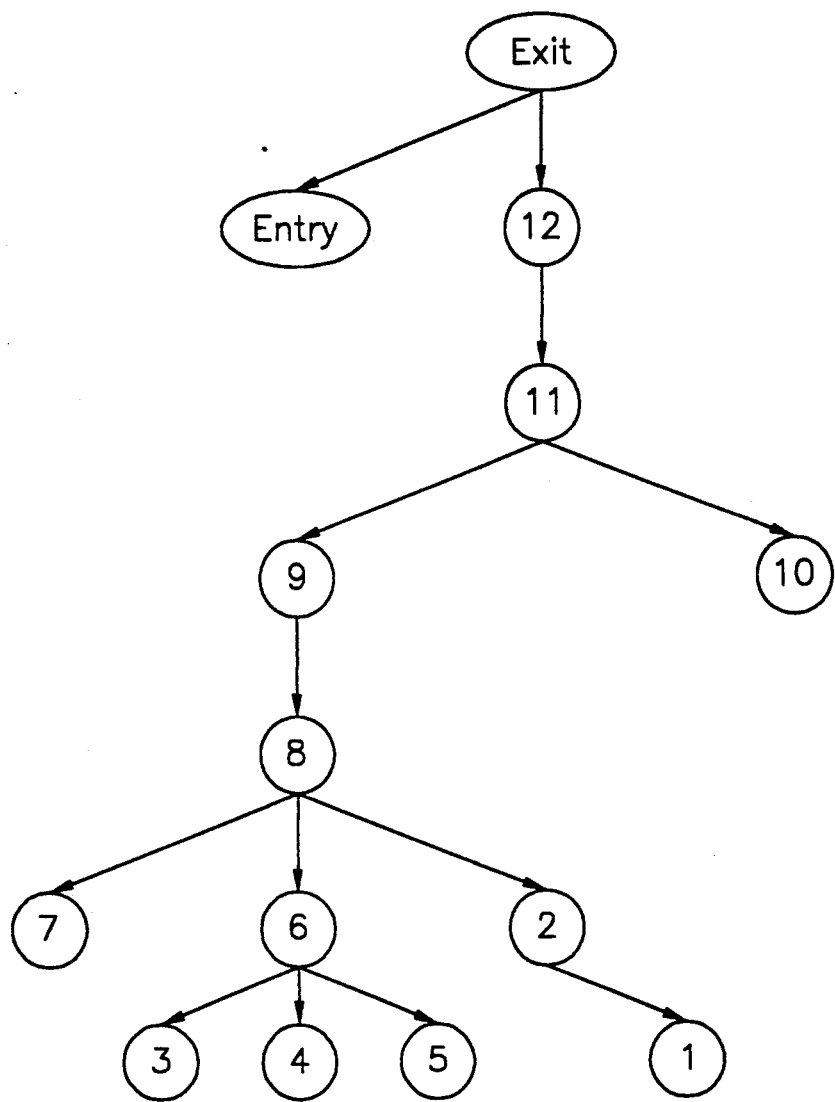
FIG. 8 shows a reverse dominator tree for the control flow graph shown in FIG. 7.

The present invention can solve the Live Variables backward problem without the same disadvantages as the SSA form. Referring to FIG. 7, a CFG 700 is shown. The Live Variables problem can be solved for variables v and w in the control flow graph 700. The data flow framework for this problem includes a reverse FG. Since the Live Variables problem is a backward data flow problem, the data flow framework includes a Flow Graph (FG) that is the reverse of the CFG 700. As shown in FIG. 8, the Dominator Tree 800 is computed with respect to the reverse control flow graph. Similarly, the Dominance Frontiers are computed with respect to the reverse control flow graph, as shown in TABLE 1. Finally, in the reverse flow graph root equals Exit.

TABLE 1

| Node | DF(Node) | Node | DF(Node) |
|---|---|---|---|
| 1 | Entry | 7 | 2 |
| 2 | Entry, 12 | 8 | Entry, 12 |
| 3 | 2 | 9 | Entry, 11, 12 |
| 4 | 3 | 10 | 9 |
| 5 | 3 | 11 | Entry, 11, 12 |
| 6 | 2 | 12 | Entry, 12 |

The Meet Semilattice L is a two-level lattice, where T represents Dead and ⊥ represents Live. The Meet operator Λ is therefore implicitly defined:

TABLE 2

| Λ | Dead (T) | Live (⊥) |
|---|---|---|
| Dead (T) | Dead | Live |
| Live (⊥) | Live | Live |

The Transfer Function with respect to variable v at node X is determined by the effect of node X on v as shown in TABLE 3:

TABLE 3

| Effect of Node X | | Transfer Function |
|---|---|---|
| Use v | | fx = Live |
| No use | Kill v | fx = Dead |
| No use | Preserve v | fx = ι |
| No use | No def | fx = ι | where preserve means that a variable is only potentially or partially modified. For example, the assignment to the array w in FIG. 7 modifies only a single element. With respect to the entire structure, the statement preserves w, and liveness of w is not affected.

Before invoking the Search procedure 235 to compute liveness for w, the procedure of the present invention performs the following initialization as indicated in Blocks 210, 215, and 220:

1. $N_{SG}$={Exit,8}, because only node 8 has a non-identity transfer function for w;
2. Meet Nodes={Entry,12}, because 12 is in the dominance frontier of 8, and Entry is in the dominance frontier of 8; and
3. $N_{SG}$={Entry,8,12,Exit}.

Figure 9:
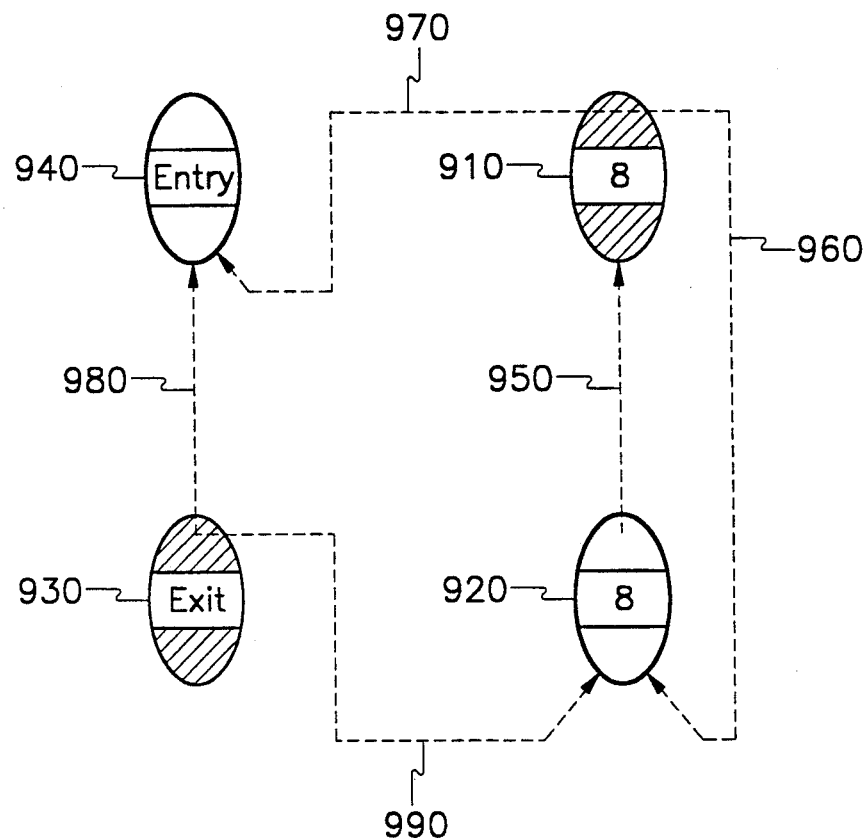
FIG. 9 shows an example of a sparse evaluation graph for Liveness(w) generated from the control flow graph shown in FIG. 7 by the present invention.

The nodes of the sparse evaluation graph NSG 900 are shown in FIG. 9. The bold ellipses are in the set Meet Nodes, while the shaded ellipses are in the set of nodes that have a non-identity transfer function.

The Search procedure 235 then begins at root=Exit. Table 4 shows a possible visitation order for the nodes.

TABLE 4

| Node visited | Link from | New TOS | Edges mapped | | Link to |
|---|---|---|---|---|---|
| Exit | | Exit | Exit | ← 12 | 12 |
| | | | Exit | ← Entry | Entry |
| Entry | | Entry | | | |
| 12 | | 12 | 12 | ← 11 | |
| 11 | | | 11 | ← 10 | |
| | | | 11 | ← 9 | |
| 10 | | | 10 | ← 9 | |
| 9 | | | 9 | ← 8 | |
| | | | 9 | ← 11 | |
| 8 | 12 | 8 | 8 | ← 6 | |
| | | | 8 | ← 7 | |
| 7 | | | 7 | ← 2 | |
| 2 | | | 2 | ← 1 | |
| | | | 2 | ← 12 | 12 |
| 1 | | | 1 | ← Entry | Entry |
| 6 | | | 6 | ← 4 | |
| | | | 6 | ← 5 | |
| 3 | | | 3 | ← 2 | |
| 4 | | | 4 | ← 3 | |
| 5 | | | 5 | ← 3 | |

The actions performed while visiting a given node are shown in the other columns of this table.

The two "link" columns refer to edges (propagating and meet) added to the sparse graph 900 of FIG. 9 by the procedure of the present invention: the "Link from" column shows propagation edges added by block 310. For example, consider the visit of sparse node eight 910. Because node eight 910 is not a meet node, the input for its transfer function is the output of whatever node was on top of the stack when node eight 910 is visited. Therefore, an edge 950 appears to be necessary in the sparse graph 900 from node twelve to node eight. However, because node eight 910 has a constant transfer function, edge 950 is not necessary.

The "Link to" column shows meet edges added by block 328. The algorithm considers the CFG edge 1→Entry while visiting node one. The meet contribution at Entry due to this edge is the output of whatever node is on top of the stack when this edge is considered. Therefore, an edge 970 should be added from node eight 910 to the meet input of Entry 940. Because the output of node eight 910 is constant, its value of ⊥ is applied directly to obtain $IN_{Entry}$=⊥.

The dashed edges in FIG. 9 represent sparse graph evaluation edges absent from the graph due to constant transfer function optimization.

As each flow graph edge is listed in the "edges mapped" column, it is mapped to the node on top of the stack (i.e., "New TOS" column). The sparse graph 900 can now be evaluated by iteration, elimination, or any known or future developed method of choice. One skilled in the art would readily recognize the plethora of ways the sparse graph 900 can be evaluated. Because the graph 900 of FIG. 9 contains no unoptimized edges, evaluation for this example is very fast. When node two was visited during sparse graph construction, $IN_{12}$ became $\bot$ when node eight was linked to node twelve. The lowering of node twelve's input causes evaluation of its transfer function to obtain $OUT_{12}=\bot$. Thus, the final solution in terms of the sparse graph is shown in TABLE 5:

TABLE 5

| Edges mapped to node | have solution |
|---|---|
| 8 | Live |
| 12 | Live |
| Exit | Dead |

For example, edge 6→4 is mapped to node eight 910, whose final solution is Live. Inspection of FIG. 7 confirms that w is live at this edge.

Now consider construction of a sparse evaluation graph to determine liveness for v. The steps shown in Table 6 result in the sparse graph of FIG. 10.

TABLE 6

| Node visited | Link from | New TOS | Edges mapped | | Link to |
|---|---|---|---|---|---|
| Exit | | Exit | Exit | ← | 12 |
| | | Exit | Exit | ← | 12 Entry |
| Entry | | Entry | | | |
| 12 | | Entry | 12 | ← | 11 |
| 11 | 12 | 12 | 11 | ← | 10 |
| | | | 11 | | 9 |
| 10 | | 11 | 10 | ← | 9 |
| 9 | | | 9 | ← | 8 |
| | | | 9 | | 11 | 11 |
| 8 | | 8 | 8 | ← | 6 |
| | | | 8 | | 7 |
| 7 | 11 | 7 | 7 | ← | 2 | 2 |
| 2 | | 2 | 2 | ← | 1 |
| | | | 2 | | 12 | 12 |
| 1 | | | 1 | ← | Entry | Entry |
| 6 | | 11 | 6 | ← | 4 |
| | | | 6 | | 5 |
| 3 | | 3 | 3 | ← | 2 | 2 |
| 4 | 11 | 4 | 4 | ← | 3 | 3 |
| 5 | 11 | 5 | 5 | ← | 3 | 3 |

Figure 10:
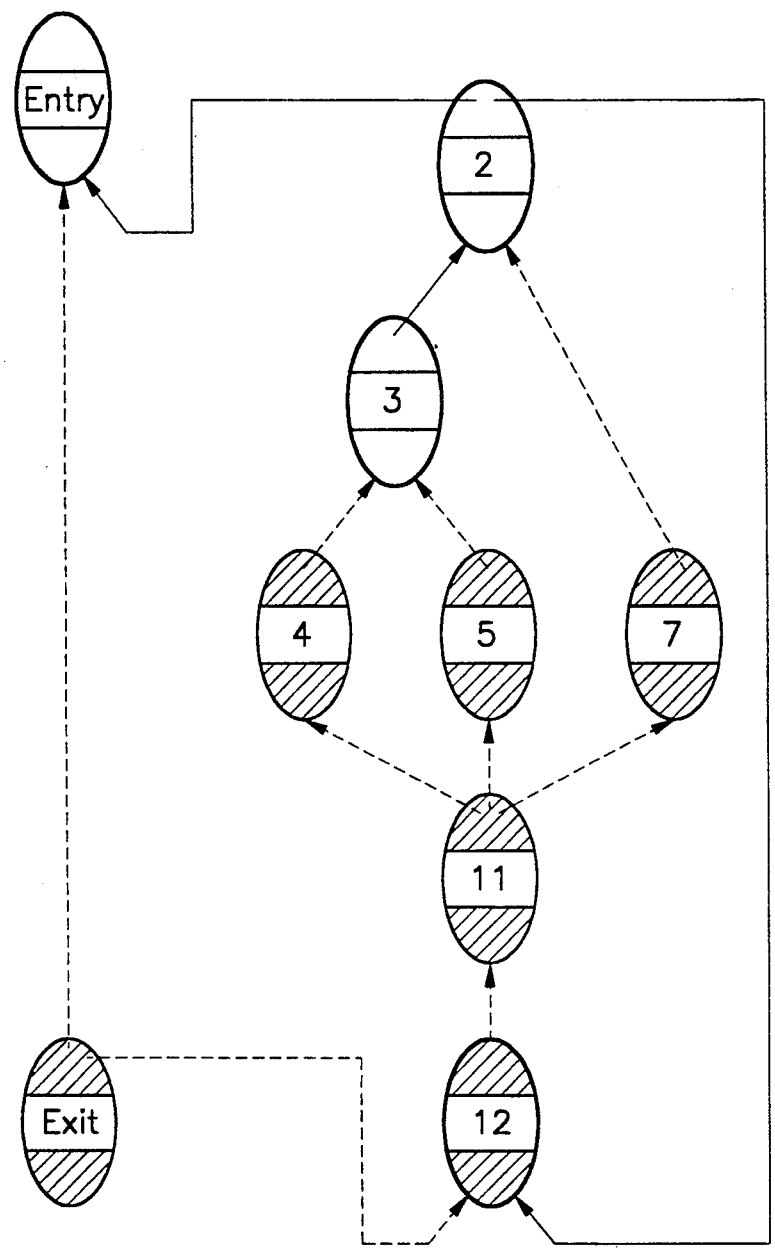
FIG. 10 shows an example of a sparse evaluation graph for Liveness(v) generated from the control flow graph shown in FIG. 7 by the present invention.

The dashed edges in FIG. 10 indicate successful optimization around constant transfer functions, while the solid edges indicate edges that must appear in the sparse evauation graph. After sparse graph construction, $IN_3$ and $IN_2$ have not changed from their initial value of T. No propagation is necessary to achieve the final solution shown in TABLE 7:

TABLE 7

| Edges mapped to node | have solution |
|---|---|
| 2 | Dead |
| 3 | Dead |
| 4 | Dead |
| 5 | Dead |
| 7 | Dead |
| 11 | Live |
| 12 | Dead |
| Exit | Dead |

2. Reaching Definitions

The Reaching Definitions problem, which is a forward problem, can be solved with the same efficiency as the SSA-based method. This form is especially attractive for program comparison (Yang et al., *Detecting Program Components With Equivalent Behaviors*, Computer Sciences Technical Report No. 840).

A "definition" of a variable v at node Z reaches a CFG edge X→Y if there exist a (possibly empty) path in CFG Z→X, and no nodes on the path Z→X other than Z that kill v.

Figure 11:
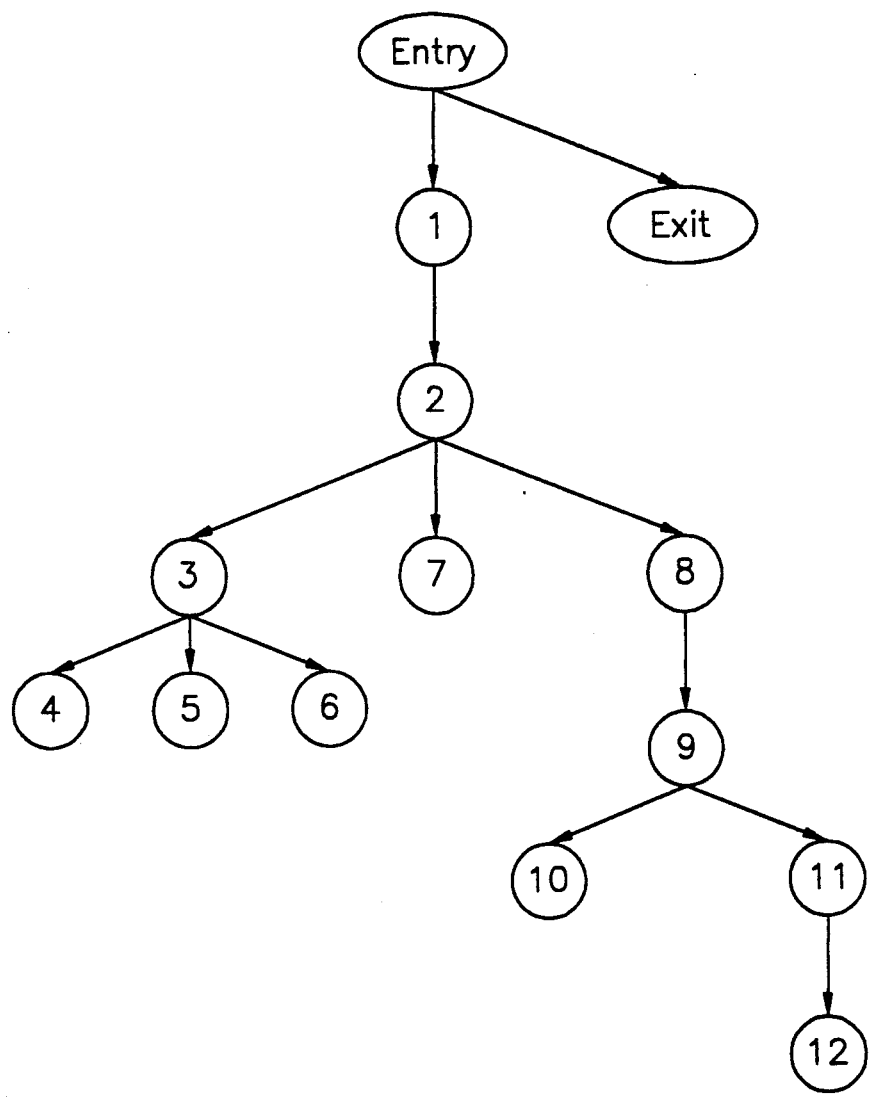
FIG. 11 shows an example of a forward dominator tree for the control flow graph shown in FIG. 7.

The following example shows how Reaching Definitions is solved for variable w in the control flow graph of FIG. 7. Consider the data flow framework for this problem: FG is the control flow graph, because Reaching Definitions is a forward data flow problem. Referring to FIG. 11, the Dominator Tree 1100 is shown for the CFG 700. Similarly, for the CFG 700, the Dominance Frontier is shown in TABLE 8. Finally, since Reaching Definition is a forward data flow problem, root equals Entry.

TABLE 8

| Node | DF(Node) | Node | DF(Node) |
|---|---|---|---|
| 1 | Exit | 7 | 8 |
| 2 | Exit, 2 | 8 | Exit, 2 |
| 3 | 8 | 9 | Exit, 2, 9 |
| 4 | 7 | 10 | 11 |
| 5 | 8 | 11 | Exit, 2, 9 |
| 6 | 8 | 12 | Exit, 2 |

The Meet Semilattice L is a powerset semi-lattice. A, the domain of L, is the set of all subsets of $N_{FG}$. Here, an element of A represents the set of definitions of variable v, indexed by the node in FG in which it appears, that can reach an edge in CFG. We take T to be the empty set, {}, and $\bot = N_{FG}$. The meet operator $\Lambda$ is set union, $\cup$, and $a \leq b$ iff $b \subseteq a$.

With respect to variable v, the Transfer Function at node X is determined by the effect of node X on v as shown in TABLE 9:

TABLE 9

| Effect of Node X | Transfer Function |
|---|---|
| Entry | $fx = \{\}$ |
| Kill v | $fx(IN) = \{X\}$ |
| Preserve v | $fx(IN) = \{X\} \cup IN$ |
| No def of v | $fx = \iota$ | where, as before, preserve means that a variable is only potentially or partially modified, as in the assignment to an array element of w in FIG. 7.

Before invoking the Search procedure 235 to compute reaching definitions for w, the procedure of the present invention performs the following initialization:

1. $N_{SG}=\{Entry,7\}$, because only those nodes have a non-identity transfer function for w;
2. Meet Nodes=\{Exit,2,8\}, because 8 is in the dominance frontier of 7, and Exit and 2 are in the dominance frontier of 8;
3. $N_{SG}=\{Entry,2,7,8,Exit\}$ The Search procedure 235 then begins at root=Entry. Table 10 shows a possible visitation order for the nodes and the actions performed while visiting a

TABLE 10

Figure 12:
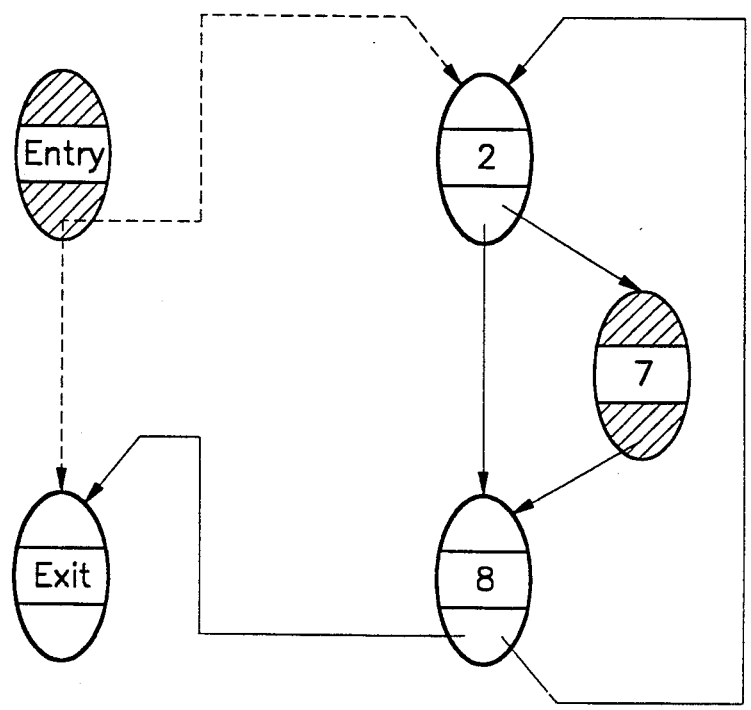
FIG. 12 shows an example of a sparse evaluation graph for Reaching Definitions(w) generated from the control flow graph shown in FIG. 7 by the present invention.

| Node visited | Link from | New TOS | Edges mapped | | | Link to |
|---|---|---|---|---|---|---|
| Entry | | Entry | Entry | → | 1 | Exit |
| | | | Entry | → | Exit | |
| 2 | | | 1 | → | 2 | 2 |
| 2 | 2 | 2 | 2 | → | 3 | |
| | | | 2 | → | 7 | |
| 3 | | 3 | 3 | → | 4 | |
| | | | 3 | → | 5 | |
| 4 | | 4 | 4 | → | 6 | |
| 5 | | 5 | 5 | → | 6 | |
| 6 | | 6 | 6 | → | 8 | 8 |
| 7 | 2 | 7 | 7 | → | 8 | 8 |
| 8 | | 8 | 8 | → | 9 | |
| 9 | | 9 | 9 | → | 10 | |
| | | | 9 | → | 11 | |
| 10 | | | 10 | → | 11 | |
| 11 | | | 11 | → | 9 | |
| | | | 11 | → | 12 | |
| 12 | | | 12 | → | 2 | 2 |
| | | | 12 | → | Exit | |
| Exit | Exit | Exit | | | | | given node. Note that the sparse evaluation graph 1200 shown in FIG. 12 is cyclic. The final solution to the Reaching Definitions problems is shown in TABLE 11. Note that in evaluating the cyclic sparse graph 1200 to obtain the solution, only a single pass through the nodes is needed.

TABLE 11

| Edges mapped to node | have solution |
|---|---|
| Entry | {} |
| 2 | {7} |
| 7 | {7} |
| 8 | {7} |

3. Reaching Uses

The present invention provides an efficient solution to the reaching uses problem. The reaching uses problem is a forward problem.

A use of a variable v at node Z reaches a CFG edge X→Y if there exist a (possibly empty) path in CFG Z→X, and no nodes on the path Z→$\chi$ that kill v.

The following example shows how Reaching Uses is solved for variable v in the control flow graph of FIG. 7. The Flow Graph and Dominance Frontier are the same as described for the Reaching Definitions. Similarly, root equals Entry.

The Meet Semilattice L is a powerset semi-lattice. A, the domain of L, is the set of all subsets of $N_{FG}$. Here, an element of A represents the set of uses of variable v, indexed by the node in FG in which it appears, that can reach an edge in CFG. We take T to be the empty set, {}, and $\bot = N_{FG}$. The meet operator $\wedge$ is set union, $\cup$, and $\alpha \leq \beta$ iff $\beta$ $\alpha$.

With respect to variable v, the Transfer Function at node X is determined by the effect of node X on v as shown in TABLE 12:

TABLE 12

| | Effect of Node X | Transfer Function |
|---|---|---|
| | Entry | fx = {} |
| | Kill v | fx = {} |
| Use v | No kill of v | fx(IN) = {X} ∪ IN |
| No use of v | No kill of v | fx = ι | where no kill of v means no definition or a preserving definition of v. Notice that both uses and killing definitions have non-identity transfer functions.

Before invoking the procedure Search 235 to compute reaching uses for v, the procedure of the present invention performs the following initialization:

1. $N_{SG}$={Entry,4,5,7,11,12}. Node 11 uses v, while nodes 4, 5, 7, and 12 kills v;
2. MeetNodes={2,6,8,9,Exit}, because 2 is in the dominance frontier of 12, 6 is in the dominance frontier of 4 and 5, 8 is in the dominance frontier of 6 and 7, 9 is in the dominance frontier of 11, and Exit is in the dominance frontier of 12; and
3. $N_{SG}$={Entry,2,4,5,6,7,8,9,11,12,Exit}.

Figure 13:
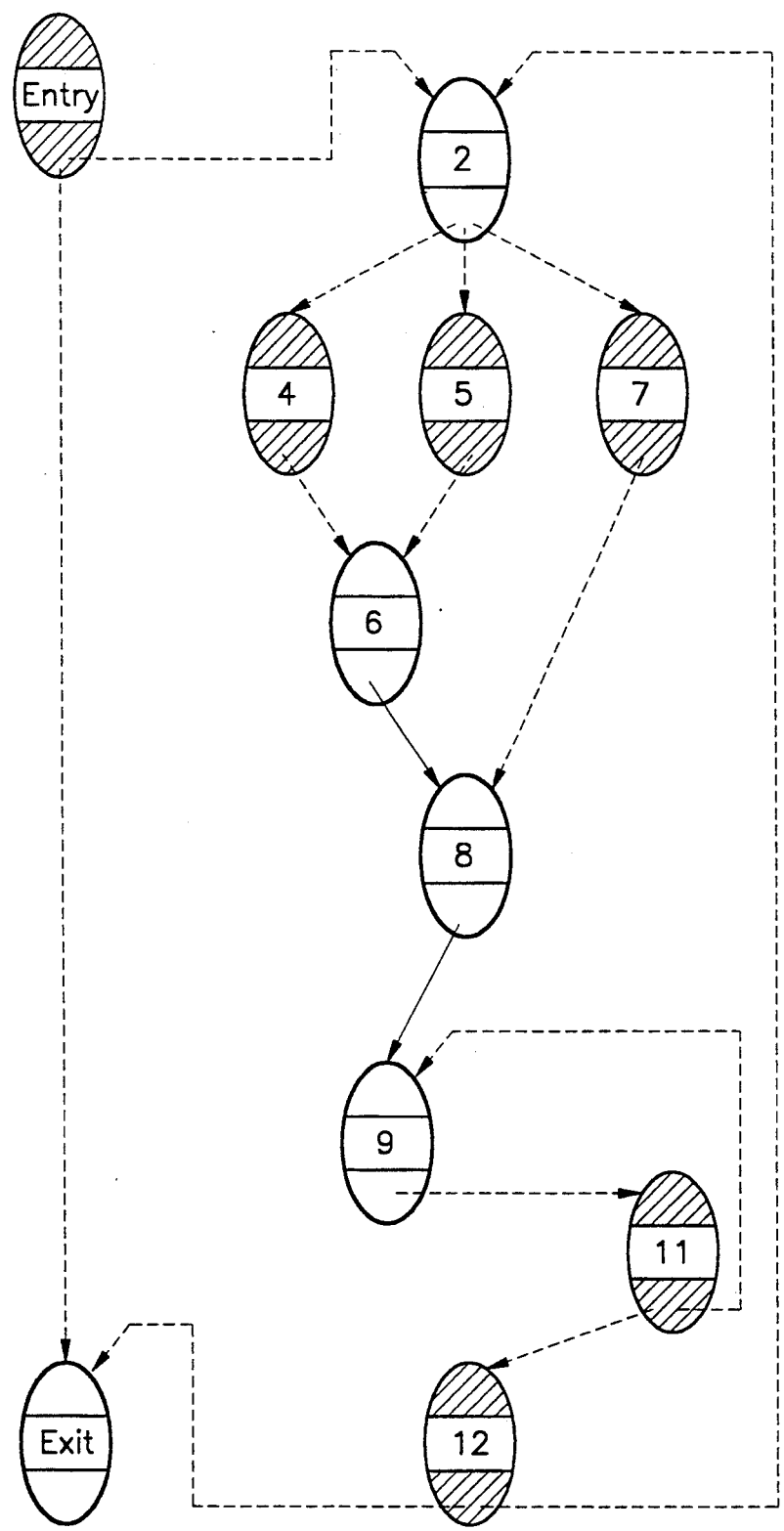
FIG. 13 shows an example of a sparse evaluation graph for Reaching Uses(v) generated from the control flow graph shown in FIG. 7 by the present invention.

The Search procedure 235 then begins at root=Entry. FIG. 13 shows the resulting sparse evaluation graph 1300. The final solution to the Reaching Uses problem is shown in TABLE 13.

TABLE 13

| Edges mapped to node | have solution |
|---|---|
| Entry | {} |
| 2 | {} |
| 4 | {} |
| 5 | {} |
| 6 | {} |
| 7 | {} |
| 8 | {} |
| 9 | {11} |
| 11 | {11} |
| 12 | {} |

While the invention has been particularly shown and described with reference to preferred embodiments thereof, it will be understood by those skilled in the art that various changes in form and details may be made therein without departing from the spirit and scope of the invention.

What is claimed is:

1. A computer-based system for solving monotone information propagation problems during the optimization of computer code, comprising:
   optimizer means for optimizing a source program represented by a data flow framework that includes a flow graph, wherein said optimizer means comprises:
   (a) first constructing means for constructing a sparse evaluation graph and a sparse map, wherein said sparse map maps edges from the flow graph to nodes in said sparse evaluation graph;
   (b) evaluator means connected to said first constructing means for evaluating said sparse evaluation graph in relation to said data flow framework in order to determine a partial solution to a monotone information propagation problem; and
   (c) combiner means for applying said sparse map to said partial solution to obtain an extended solution to said monotone information propagation problem.

2. The computer-based system of claim 1, wherein said extended solution is a complete solution.

3. The computer-based system of claim 1, further comprising compiler means for transforming said source program into optimized form, wherein said optimizer means is part of said compiler means.

4. The computer-based system of claim 1, wherein said first constructing means comprises:

(1) means for determining nodes for said sparse evaluation graph; and
(2) an edge generator, comprising:
   (A) generating means for generating edges for said sparse evaluation graph; and
   (B) mapping means for mapping edges from a flow graph contained in said data flow framework to nodes in said sparse evaluation graph to form said sparse map.

5. The computer-based system of claim 4, wherein said generating means for generating edges further includes means for providing two different optimizations related to constant transference to eliminate edges from said sparse evaluation graph.

6. The computer-based system of claim 1, wherein said optimizer means further comprises second construction means for constructing a dominator tree and a dominance frontier from said data flow framework.

7. The computer-based system of claim 1, wherein said evaluator means iteratively evaluates said sparse evaluation graph.

8. The computer-based system of claim 1, wherein said evaluator means evaluates said sparse evaluation graph by elimination.

9. The computer-based system of claim 1, wherein said optimizer means further comprises means for reversing a control flow graph for input into said first constructing means.

10. The computer-based system of claim 1, further comprising means for analyzing said source program for liveness using said extended solution.

11. The computer-based system of claim 1, further comprising means for analyzing said source program for reaching definitions using said extended solution.

12. The computer-based system of claim 1, further comprising means for analyzing said source program for reaching uses using said extended solution.

13. The computer-based system of claim 1, further comprising means for analyzing said source program for constant propagation using said extended solution.

14. A computer-based method for solving monotone information propagation problems during the optimization of source code, comprising the steps of:
   (1) entering source code into an optimizer, said source code represented by a data flow framework, said data flow framework includes a flow graph;
   (2) defining a dominator tree from said flow graph, and defining a dominance frontier from said dominator tree and said flow graph;
   (3) constructing a sparse evaluation graph and a sparse map from said data flow framework, said dominator tree, and said dominance frontier, wherein said sparse map maps edges from said flow graph to nodes in said sparse evaluation graph;
   (4) evaluating said sparse evaluation graph with respect to said data flow framework, in order to determine a partial solution to a monotone information propagation problem; and
   (5) applying said sparse map to said partial solution to obtain an extended solution to said monotone information propagation problem.

15. The computer-based method of claim 14, wherein said step of constructing said sparse evaluation graph comprises the steps of:
   (1) determining a set of sparse evaluation graph nodes, comprising the steps of:
      (i) defining a set of Active Nodes by forming a set that includes a starting root node along with all nodes that do not have an identity transfer function;
      (ii) defining a set of Meet Nodes by taking the iterated dominance frontier of said active nodes; and
      (iii) combining said set of Active Nodes with said set of Meet Nodes;
   (2) initializing each input of said sparse evaluation graph nodes to the best possible solution;
   (3) determining a set of edges for said sparse evaluation graph; and
   (4) mapping edges from said flow graph to nodes in said sparse evaluation graph to form said sparse map.

16. The computer-based method of claim 14, wherein said extended solution is a complete solution.

17. The computer-based method of claim 14, wherein said step of evaluating said sparse evaluation graph is accomplished by iteration.

18. The computer-based method of claim 14, wherein said step of evaluating said sparse evaluation graph is accomplished by elimination.

19. The computer-based method of claim 14, further comprising the step of analyzing said source program for liveness using said extended solution.

20. The computer-based method of claim 14, further comprising analyzing said source code for "reaching definitions" using said extended solution.

21. The computer-based method of claim 14, further comprising analyzing said source code for "reaching uses" using said extended solution.

22. The computer-based method of claim 14, further comprising analyzing said source code for "constant propagation" using said extended solution.

23. The computer-based method of claim 15, wherein said step of determining a set of edges comprises the step of using a pre-order and post-order traversal of said dominator tree nodes to vis each node twice;
   (a) wherein said pre-order traversal of said dominator tree comprises the steps of:
      (i) determining whether said node being visited is in said set of Meet Nodes, and if not, then generating a propagating edge for said sparse evaluation graph;
      (ii) checking to see if said node being visited is in said set of sparse evaluation graph nodes, and if so, then pushing said node being visited onto a stack;
      (iii) for each out-edge of said node being visited, map said out-edge with said node on the top of said stack to form said sparse map;
      (iv) generating a meet edge for said sparse evaluation graph if said successor node is in said set of Meet Nodes; and
   (b) checking during said post-order traversal of said dominator tree to determine whether said node being visited is in said set of sparse evaluation graph nodes, and if so, then popping said sparse evaluation graph node from said stack.

24. The computer-based method of claim 23, wherein said step of generating a propagating edge and said step of generating a meet edge, comprises the steps of:
   (1) excluding a potential edge from said sparse evaluation graph if the target of said potential edge is either a root node or is not in said sparse evaluation graph;

(2) determining whether the target of said potential edge has a constant transfer function, and if so, then disregarding said potential edge; and (3) determining whether the source of said potential edge has a constant transfer function, and if so, then propagating this information into the node that is a target of said potential edge, otherwise insert said potential edge into said sparse evaluation graph.

25. The computer-based system of claim 1, wherein said means for constructing said sparse evaluation graph comprises:

(1) means for determining a set of sparse evaluation graph nodes, comprising:

(i) means for defining a set of Active Nodes by forming a set that includes all nodes that do not have an identity transfer function and a starting root node;

(ii) means for defining a set of Meet Nodes by taking the iterated dominance frontier of said active nodes; and (iii) means for combining said set of Active Nodes with said set of Meet Nodes;

(2) means for initializing each input of said sparse evaluation graph nodes to the best possible solution;

(3) means for determining a set of edges for said sparse evaluation graph; and (4) means for mapping edges from said flow graph to nodes in said sparse evaluation graph to form said sparse map.

26. A computer-based method of constructing a sparse evaluation graph and a sparse map from a source program represented by a data flow framework, the data flow framework includes a flow graph representing the source program and a formal basis for describing the behavior of nodes within the flow graph, wherein the sparse evaluation graph and sparse map are used for solving a monotone information propagation problem, the computer-based method comprising the steps of:

(1) generating a dominator tree from the flow graph, and generating a dominance frontier from said dominator tree and the flow graph;

(2) generating a set of sparse evaluation graph nodes, comprising the steps of:

(i) defining a set of Active Nodes by forming a set that includes all nodes that do not have an identity transfer function and a starting root node;

(ii) defining a set of Meet Nodes by taking the iterated dominance frontier of said active nodes; and (iii) combining said set of Active Nodes with said set of Meet Nodes;

(3) initializing each input of said sparse evaluation graph nodes to the best possible solution;

(4) determining a set of sparse evaluation graph edges; and (5) mapping edges from the flow graph to nodes in the sparse evaluation graph to form the sparse map; and (6) evaluating said sparse evaluation graph with respect to said data flow framework, in order to determine a partial solution to a monotone information propagation problem; and (7) applying said sparse map to said partial solution to obtain an extended solution to said monotone information propagation problem.

27. The computer-based method of claim 26, wherein said step of determining a set of edges comprises the step of using a pre-order and post-order traversal of said dominator tree nodes to visit each node twice;

(a) wherein said pre-order traversal of said dominator tree comprises the steps of:

(i) determining whether said node being visited is in said set of Meet Nodes, and if not, then generating a propagating edge for said sparse evaluation graph;

(ii) checking to see if said node being visited is in said set of sparse evaluation graph nodes, and if so, then pushing said node being visited onto a stack;

(iii) for each out-edge of said node being visited, map said out-edge with said node on the top of said stack to form said sparse map; and (iv) generating a meet edge for said sparse evaluation graph if said successor node is in said set of Meet Nodes; and (b) checking during said post-order traversal of said dominator tree to determine whether said node being visited is in said set of sparse evaluation graph nodes, and if so, then popping said sparse evaluation graph node form said stack.

28. The computer-based method of claim 27, wherein said step of generating a propagating edge and said step of generating a meet edge, comprises the steps of:

(1) excluding a potential edge from said sparse evaluation graph if the target of said potential edge is either a root node or is not in the sparse evaluation graph;

(2) determining whether the target of said potential edge has a constant transfer function, and if so, then disregarding said potential edge; and (3) determining whether the source of said potential edge has a constant transfer function, and if so, then propagating this information into the node that is a target of said potential edge, otherwise insert said potential edge into the sparse evaluation graph.

* * * * *